Sept. 17, 1946.  R. H. DEURMYER ET AL  2,407,736
SAW FILING GAUGE
Filed May 8, 1945  2 Sheets-Sheet 1

Inventors
CLEO G. YOCUM
and RICHARD H. DEURMYER

By Clarence A. O'Brien
and Harvey B. Jacobson
Attorneys

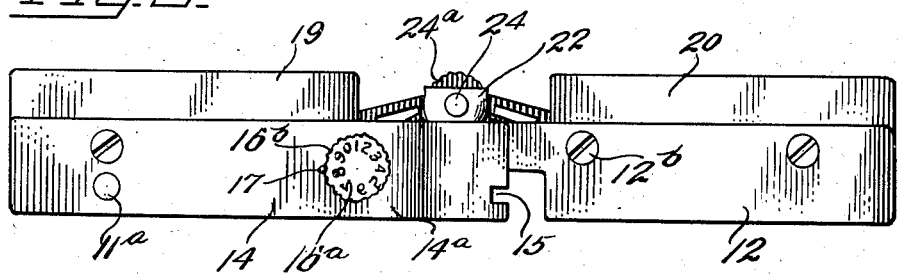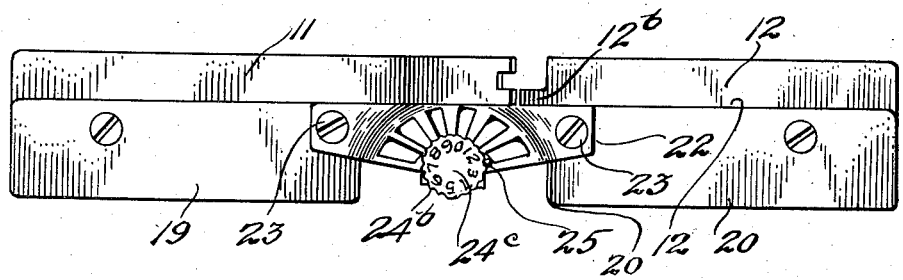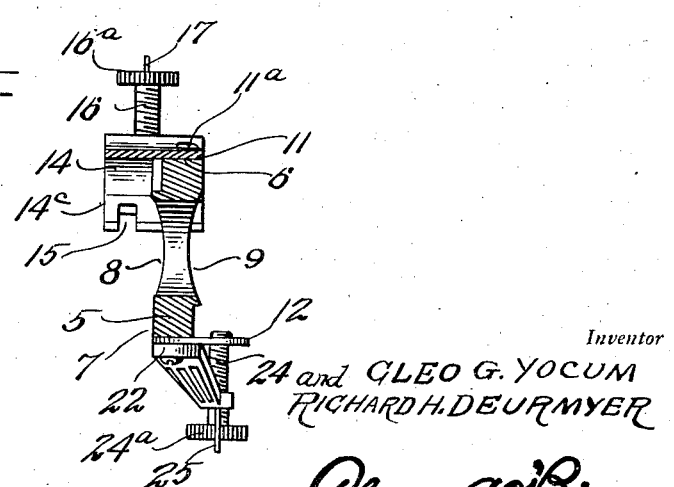

Patented Sept. 17, 1946

2,407,736

UNITED STATES PATENT OFFICE 2,407,736

SAW FILING GAUGE

Richard H. Deurmyer, Eugene, and Cleo G. Yocum, Cheshire, Oreg.

Application May 8, 1945, Serial No. 592,634

3 Claims. (Cl. 76—46)

This invention relates to an improved gauge to guide a filer in correctly filing the teeth of hand and other types of straight saw blades, and one of its objects is to provide a gauge with means for establishing the exact cutting profile or edge to be given a tooth of a saw blade, which will serve as a positive match for filing the tooth.

Another object of the invention is the provision of a saw filing gauge with an indexed screw for controlling, with the aid of a stop plate, the length of the teeth to be filed, and another screw, similarly indexed, for checking filed teeth.

With the above and other objects in view, the invention relates to certain new and useful constructions, combinations, and arrangements of parts clearly described in the following specification, and fully illustrated in the accompanying drawings, in which:

Fig. 3 is an elevation, showing one side of the gauge.

Fig. 4 is a similar view, showing the other side of the gauge.

Fig. 5 is a transverse sectional view, taken on line 5—5 of Fig. 1, looking in the direction of the arrows.

Figure 1:
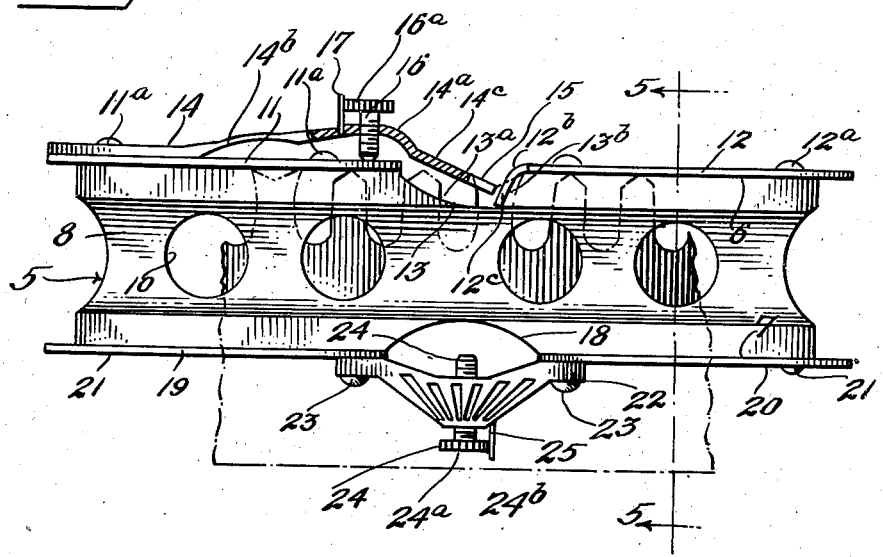
Fig. 1 is a top plan view, with a part shown in section.
Figure 2:
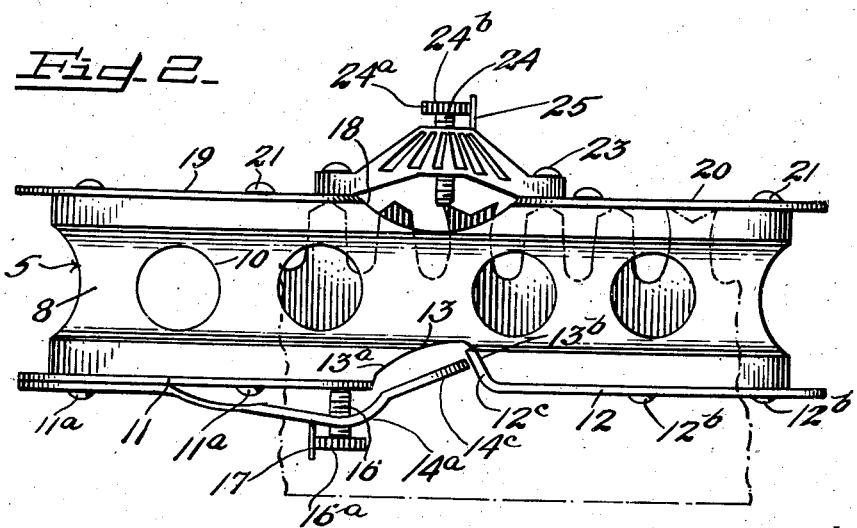
Fig. 2 is a bottom plan view.

Referring to the accompanying drawings, which illustrate the practical embodiment of our invention, 5 designates a main frame bar, which is formed with parallel longitudinal side edges 6 and 7, and with concave intermediate faces 8 and 9, on the opposite sides thereof. The bar 5 is further formed with transverse openings 10, designed to lighten the same.

The bar 5 is equipped with a plate 11 attached to the side edge 6, by the rivets 11a, and a second plate 12, attached to the same side edge by the rivets 12a. The bar 5 is formed with an approximately L-shaped opening 13, which thus provides the long diagonal side face 13a and the short diagonal side face 13b. The plate 11 has its inner end disposed adjacent to the left end of the opening 13, and the plate 12 is formed with a finger 12b, which is deflected inwardly against the short diagonal end face 13b, and is relieved at 12c to provide a clearance for the sliding movement of the cutting teeth of the saw blade. The two plates 11 and 12 are disposed in longitudinal alignment, and both plates are wider than the edge 6, so that a stop flange is thereby provided on each side of the bar 5, along which the cutting points of the saw blade are placed and the saw shifted horizontally.

Against the side of the plate 11 a third plate or strip 14 is secured by one of the rivets 11a, and this plate or strip is arched outwardly at 14a to provide a spring arm, which is reduced at 14b to increase its resiliency. This spring arm is formed with a diagonal terminal finger 14c, which projects into the L-shaped opening 13, and the inner end of this terminal finger is formed with a notch 15, through which the cutting points of the saw teeth are moved. The notch 15 and the clearance 12c are disposed in the same plane, so that the saw blade resting on the upper surface of the bar 5 will slide through the clearance and the notch.

The spring arm 14a is equipped with a screw 16, which is threaded through this arm so that its point will engage the plate 11, and this screw is provided with a circular head 16a, which is marked by an annular row of figures from 1 to 0, consecutively, and spaced equally apart. The edge of this head is formed with latching notches, one of each of which is located opposite each number, and a spring pin 17, secured at its inner end to the spring finger is adapted to snap into and out of each notch as the screw is turned.

The side edge 7 is formed with an opening 18, located in opposition to the L-shaped opening 13, but not centered on the opening 13, and is provided with plates 19 and 20, which are secured by the rivets 21 to the side 7, so that the side longitudinal edges of both plates will project laterally of the bar 5, as in the case of the plates 11 and 12 of the side edge 6. The plate 19 has its inner end disposed at one side of the opening 18, and the plate 20 has its inner end disposed at the other side of the opening 18.

A bridge member 22, which may be a casting or stamping, is secured by rivets 23 across the opening 18, and the intermediate and inner side portion of this bridge member is outwardly relieved and a screw 24 is threaded through the bridge member with its axis perpendicular to the plane of the plates 19 and 20. This screw is provided with a circular head 24a, which is marked by a circular row of numbers from 1 to 0, consecutively. This head is also formed with latching recesses or notches 24b, one opposite each number, and a spring pin 25, secured to the bridge member 22 engages each notch in turn.

The diagonal finger 14c of the plate 14, provides means for controlling the angle of the cutting tooth, in working a file by hand across the gauge, in the position shown in dotted lines in Fig. 1. The angular fingers 12b and 14c also support the saw tooth which is being filed.

The screw 24 is given a similar adjustment to the screw 16, and the point of the screw 24 provides means for checking the alignment of the finished cutting teeth, when the gauge is reversed and the saw is placed with its teeth against the plates 19 and 20. If the adjustment of the screw 16 places the number 3 of its head in latched position, then the head of the screw 24 is similarly latched, with the number 3 in line with the spring latch pin 25.

The working position the gauge is placed in will, of course depend somewhat on the equipment available to the saw filer.

It is understood that various changes in the details of construction, their combination and arrangement, and in the use of materials required for construction, may be resorted to within the scope of the invention, as defined by the claims hereof.

Having described our invention, we claim as new:

1. A saw gauge, comprising a bar having a straight edge with a recess between its ends, saw blade guides secured to said edge on opposite sides of the recess, one of said guides having an angular finger projecting into said recess and relieved to provide a clearance for the saw blade, an outwardly arched spring arm secured to the bar, a terminal finger on said arm projecting into said recess, a screw threaded through the spring arm to engage the bar and adjust the angle of the terminal finger in said recess to establish the profile of the saw tooth to be filed and said terminal finger having a notch to allow the saw teeth to move through the finger.

2. A saw gauge, comprising the construction set forth in claim 1, the screw having a head indexed with consecutive numbers and provided with latching means, saw guides on the opposite side of the bar, and a screw associated with the last-named saw guides, a head on the last-named screw provided with a set of index numbers similar to the numbers of the first-named screw, whereby said second-named screw may be adjusted to duplicate the adjustment of the first named screw, for checking the filing of a saw blade.

3. A saw gauge comprising a bar, parallel faces on opposite sides of the bar, each such face having a recess intermediate its ends, a saw blade guide secured to the parallel face on each side of each recess, the saw blade guides on one face extending laterally from the bar in a direction opposite that in which those on the other face of the bar extend, an angular extension on one of the guides projecting into the adjacent recess, said angular extension being bifurcated to receive and support a saw tooth, an outwardly bowed spring arm carried by the guide on the side of the recess opposite that into which the angular extension projects, an angular finger on the arm projecting into the recess to establish a cutting profile for the edge of a saw tooth located in the bifurcation in the angular extension, an indexed adjusting screw carried by the spring arm for regulating the angularity of the finger, a bridge member extending across the recess in the opposite side face of the bar, a screw carried by the bridge member and adapted to contact a tooth of a saw blade engaging the guides adjacent the bridge member and indices on the last-named screw coordinated with the indices on the first-named screw whereby the adjustment of the screws may be duplicated for checking the filing of a saw blade whereby tooth to tooth variations may be eliminated.

RICHARD H. DEURMYER.
CLEO G. YOCUM.